3,525,660
ARTIFICIAL FLOWERS PREPARED FROM SLIT SHEETS OF MOLECULARLY ORIENTED PLASTIC
James E. Kerrigan, Arlington Heights, Ill., assignor to CPS Industries, Inc., a corporation of Delaware
Filed Dec. 13, 1966, Ser. No. 601,464
Int. Cl. A41g 1/00
U.S. Cl. 161—30                                        20 Claims

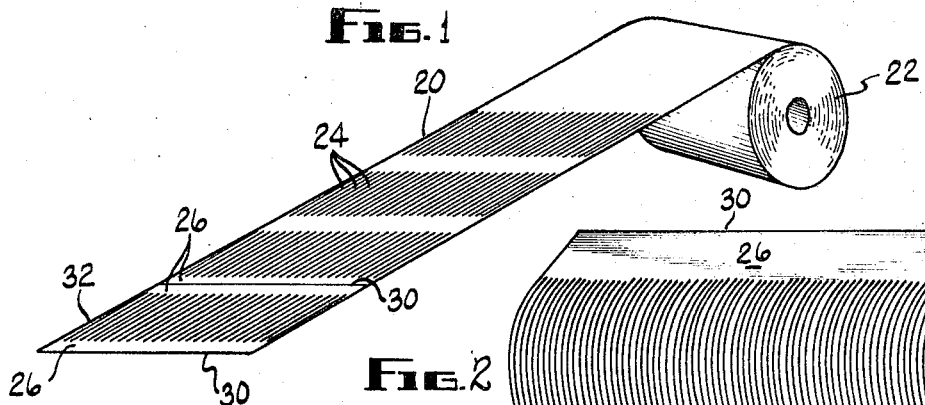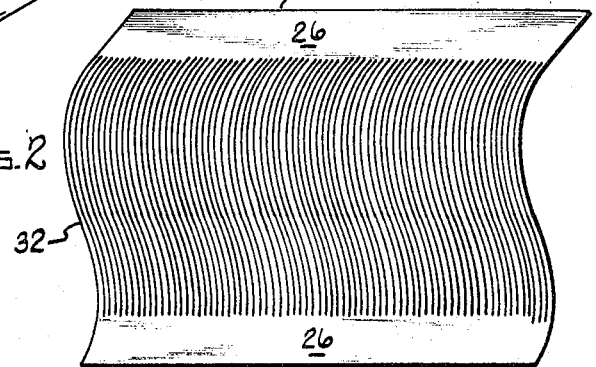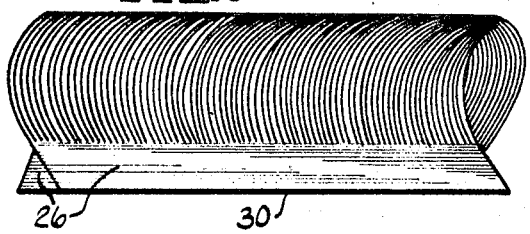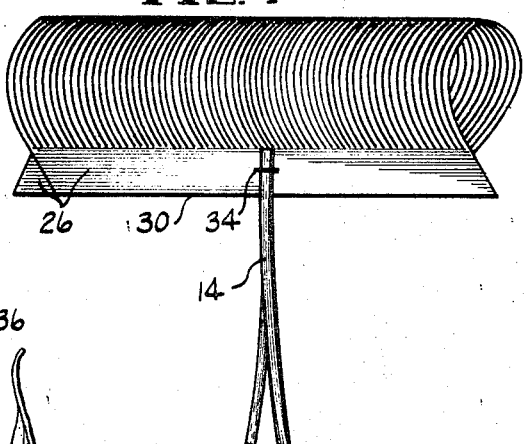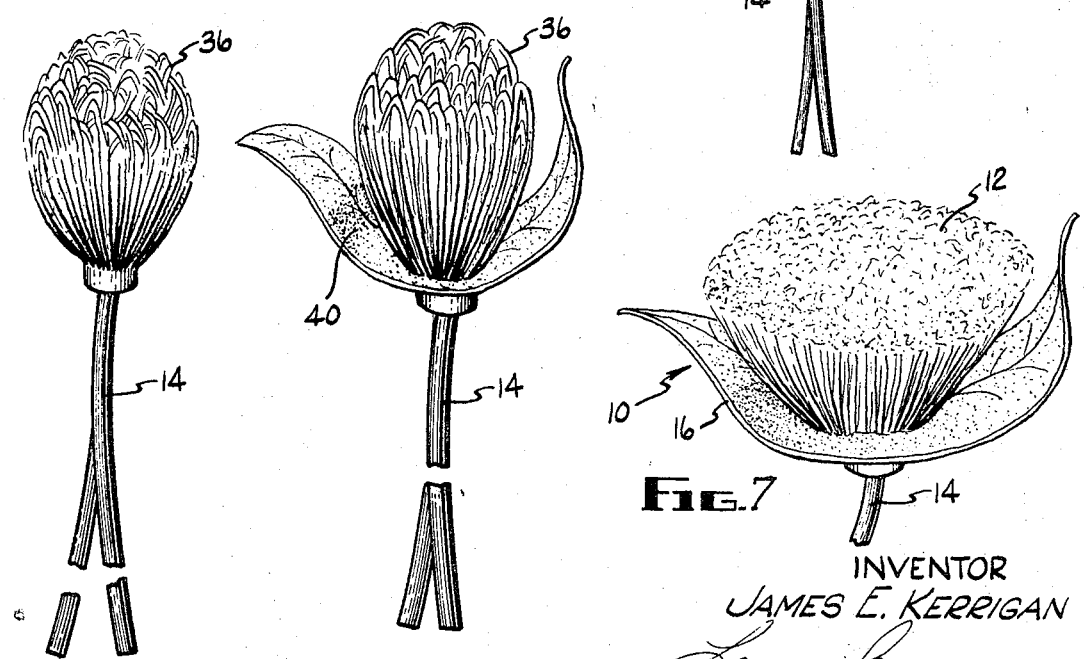
INVENTOR
JAMES E. KERRIGAN
ATTORNEY

United States Patent Office 3,525,660
Patented Aug. 25, 1970

ABSTRACT OF THE DISCLOSURE

The disclosure describes a decorative article called a split-mum bow which is specially constructed to be made economically on automated machines and a method of making the bow.

In the preferred embodiment, the bow comprises a parallelogram sheet of unidirectionally oriented material, such as polypropylene or one or more widths of weftless ribbon, through which a large number of slits are cut in the direction of orientation. The sheet is folded so that the opposite ends of each slit are secured at nearly adjacent positions and then the sheet is wrapped about an axis parallel to the direction of orientation and located near the center of the end of the sheet to form a bud. The bud is shaped by pressing on or cutting the bights of bows that have been formed until the desired flower-like appearance is achieved. The disclosure describes how various decorative backings and stamens can be added to enhance the visual appearance of the article. Other modifications are also described.

---

This invention relates to decorative articles and methods for making decorative articles economically.

The manual fabrication of quality decorative articles requires a high degree of dexterity and artistic sense possessed by few people. For this reason it is not possible to produce hand-made decorations such as ribbon bows in the large numbers or at the low cost required by the mass-production packaging industry. A great deal of effort has been expended in trying to develop methods for automating the fabrication of decorations and the results of these efforts are, in large measure, worthwhile; however, the automatic manufacture of complicated articles such as flower-like ribbon bows with prior art machines remained to be accomplished.

Accordingly, it is a principal object of this invention to disclose an attractive decorative article and an automatic method of manufacturing it. This and other objects, features and advantages of the invention will become more readily apparent from the following description of a novel decorative article called a split-mum bow and a method for automatically manufacturing the bow in which:

FIGS. 1–7 are illustrations of a split-mum bow of this invention at different stages in its fabrication.

A split-mum bow 10 created according to this invention is illustrated in its completed form in FIG. 7. The bow comprises a plurality of bights 12 providing the main decorative effect; a stem 14, resembling a flower stem, which can be used for attaching the bow 10 to another article; and a decorative backing 16 which, in the illustrated embodiment, is shaped to resemble the leaves of a flower.

The quality of the visual effect and the cost and speed at which the article such as the split-mum bow can be produced is directly related to the types of materials chosen for its fabrication. Given these criteria, one of the most successful materials for forming the central portion of the bow is a unidirectionally oriented plastic such as polypropylene.

The polypropylene used for fabricating the bow is formed in a long, continuous sheet 20 which may be wound on a roll 22, as shown in FIG. 1, with the oriented direction of the polypropylene being perpendicular to the axis of the roll 22. As the polypropylene sheet 20 is drawn from the roll 22, a comb having a large number of pins for teeth (not shown) is periodically pushed into the sheet 20 so that the pins open a large number of parallel slits 24 in the sheet which are parallel to the direction of orientation of the polypropylene molecules forming the sheet.

In the illustrated embodiment, the sheet is about 7 inches wide and approximately 225 slits are formed at 1/32 inch intervals. The slits are about 5½ inches long. They terminate in end portions 26 which are about ¾ inch long.

The end portions 26 are bounded by edges 30 which are cut at transverse directions to the orientation of the slits and the polypropylene molecules. In the illustrated embodiment, the angle between the edges 30 and the axis of one of the slits 24 is approximately 60°.

As shown in the lower right hand corner of FIG. 1, a parallelogram 32 is formed containing the slits 24, the ends 26 and edges 30.

Referring to FIG. 2, the parallelogram sheet 32 is realigned to resemble a rectangle. This causes the opposite ends of each slit 24 to become aligned respectively with the same line which is perpendicular to the edges 30.

The parallelogram 32 is now folded so that the surfaces of the opposite ends 26 come into contact with the opposite ends of each slit in an approximately juxtaposed position over each other, or in an adjacent or contiguous relationship; thereby assuming structural formation with a ribbon-like edge 30, as shown in FIG. 3. The ends 26 are secured to each other by heat sealing or by the application of an adhesive such as a hot melt to the contacting surfaces.

Where a stem is required, a piece of pipe cleaner or covered wire 14 may be attached to the folded sheet at a point near the center of the ends 26. The stem 14 may be secured to the ends 26 by twisting it around the ends 26 or securing it to the ends by means such as a staple 34 as shown in FIG. 4.

Where a stem is used, it serves as the axis upon which the folded sheet is wound to produce the bud 36 as shown in FIG. 5. The bud is formed by winding from the center, rather than from one end as taught in the prior art, because a more appealing and convoluted flower-like decoration is achieved and because fewer revolutions are required to complete the assembly.

After the bud 36 is formed, an optional decorative backing 40 in a form such as leaves may be secured to the bud 36 by any of a number of adhesives to form the combination illustrated in FIG. 6. Also, stem-like wires or rods may be included in the center of the convolution.

After the decorative backing is attached, the bow may be shaped to enhance its decorative appearance. Various shaping techniques may be used such as pressing on the top of the ribbon bights to cause the bights to spread outward from the center. The bights also may be cut to remove their more arcuate portions; thereby causing the bud to assume a flower-like appearance as shown in FIG. 7.

A number of modifications are practical to enhance the beauty of the decoration or to make it easier to manufacture. A few of these will be described.

First, ribbons and fabrics may be used in place of materials such as polypropylene. One ribbon which has been found to produce excellent results is a fabric comprising a plurality of threads bonded together by a material such as the water-activated adhesive, polyvinyl alcohol. The threads, which may be of materials such as rayon or cotton, are oriented in the same direction as that described for the polypropyleyne molecules in the preceding illustration. Where the ribbon contains a water-activated adhesive, the sealing and adhesive steps described above can be modified to allow for the application of moisture to the contacting surfaces instead of heat or a layer of adhesive.

Second, where the use of wide sheets is not practical, a plurality of narrow ribbons of any of the materials previously described can be jointed side-by-side to form a wide sheet. The ribbons may be of the same color or they may have several different colors. In the latter case, highly unusual visual effects may be produced.

Third, the ratio of the height to the width of the paralleogram can be changed, as well as the dimensions of the end portions, to change the final dimensions of the bow. Changing the spacing of the slits also produces a marked change in the appearance of the decoration.

Finally, various types of backings and stems can be used to vary the appearance of the bow or to change the means by which it is attached to the product to be decorated. By using a random assortment of decorative backings and stems and by periodically changing the means for shaping the bow, a large number of visually distinctive bows can be produced at a high speed by simple, automated linear transfer machines.

Having described the article and its method of manufacture, it will be apparent to those skilled in the art that many more modifications are possible.

I claim:

1. A decorative article comprising a sheet of material having a single direction of molecular orientation, a plurality of closely spaced slits of similar discrete lengths formed in said sheet, said slits being longitudinally aligned with the direction of molecular orientation, the ends of said slits being aligned to provide a solid unslitted selvage-like edge extending beyond said slits, said sheet being loosely doubled back on itself with the ends of said slits being approximately juxtaposed over each other in a contiguous relationship, said selvage-like edges coming together to form a ribbon, and stem means attached to approximately the center of said ribbon, said ribbon being tightly wound about said stem to form a tightly convoluted flower-like decoration.

2. The article of claim 1 wherein said sheet is cut at the bights of bows formed when said sheet doubles back on itself, the cut ends of said bows being shaped to form the petals of a simulated flower.

3. The article of claim 2 and a leaf-shaped decorative sheet fitted over said stem and around said wound-up ribbon.

4. The decorative article of claim 1 wherein the sheet is a unidirectionally oriented plastic.

5. The decorative article of claim 4 wherein the plastic is polypropylene.

6. The decorative article of claim 1 wherein the sheet is a weftless wabric comprising bonded threads.

7. The decorative article of claim 6 wherein the fabric comprises a plurality of weftless ribbons.

8. The decorative article of claim 7 wherein at least two of the ribbons are of different colors.

9. The decorative article of claim 6 wherein the fabric ribbon comprises rayon threads.

10. The decorative article of claim 9 wherein the material bonding the threads together is a water-activated adhesive.

11. The decorative article of claim 10 wherein the adhesive is polyvinyl alcohol.

12. The decorative article of claim 10 wherein the adhesive is a hot melt.

13. The decorative article of claim 1 comprising in addition an adhesive located between the two ends.

14. A method of fabricating a decorative article comprising the steps of:
 (a) slitting a sheet of molecularly unidirectional oriented material to obtain slits in the oriented direction;
 (b) cutting opposite edges of the sheet in a direction transverse to the oriented direction;
 (c) folding the sheet so that the opposite ends of each slit are respectively adjacent;
 (d) securing the ends of the sheet bounded by the transverse edges together; and
 (e) tightly wrapping the sheet about a point located near the center of the secured ends to form a tightly convoluted flower-like decoration.

15. The method of claim 14 wherein the ends are secured by.
 (a) applying a hot melt to one of the ends; and
 (b) pressing the other end against the exposed surface of the hot melt.

16. The method of claim 14 wherein the sheet comprises a thermoplastic material and the ends are secured by:
 (a) pressing surfaces of the ends together; and
 (b) applying heat to the contacting surfaces.

17. The method of claim 14 comprising the additional step of:
 attaching a stem to the secured ends at the point around which the sheet is wrapped.

18. The method of claim 14 comprising the additional step of:
 attaching a decorative backing to the sheet.

19. The method of claim 14 comprising the additional step of:
 shaping the article.

20. The method of claim 14 comprising the additional step of:
 cutting the bights of bows formed in the sheet between the slits.

References Cited

UNITED STATES PATENTS

| | | | |
|---|---|---|---|
| 3,133,851 | 5/1964 | Reukauf | 161—28 X |
| 3,154,457 | 10/1964 | Ranoha | 161—21 X |
| 3,174,886 | 3/1965 | Miscovich | 161—9 X |
| 3,394,045 | 7/1968 | Gould | 161—402 X |

FOREIGN PATENTS 772,643  11/1934  France.

JOHN T. GOOLKASIAN, Primary Examiner

J. C. GIL, Assistant Examiner

U.S. Cl. X.R.

156—61; 161—402